United States Patent
Kanouda et al.

[11] Patent Number: 5,959,858
[45] Date of Patent: Sep. 28, 1999

[54] ELECTRIC POWER CONVERSION APPARATUS

[75] Inventors: Akihiko Kanouda, Hitachinaka; Yoshimi Sakurai, Hitachiota; Kenji Kubo, Hitachi; Hideyasu Umetsu, Hitachi; Hideaki Kunisada, Hitachi; Keizo Shimada, Juo-machi; Takayasu Nakane, Kitaibaraki, all of Japan

[73] Assignees: Hitachi, Ltd., Tokyo, Japan; Hitachi Engineering Co., Ltd., Ibaraki, Japan

[21] Appl. No.: 08/974,165

[22] Filed: Nov. 19, 1997

[30] Foreign Application Priority Data

Nov. 20, 1996 [JP] Japan ................................. 8-308991

[51] Int. Cl.$^6$ .................................................. H02M 5/00
[52] U.S. Cl. .............................................. 363/149
[58] Field of Search .................................. 363/149, 150, 363/152; 318/798, 800, 801, 809

[56] References Cited

U.S. PATENT DOCUMENTS

| | | | |
|---|---|---|---|
| 4,021,704 | 5/1977 | Norbeck | 317/48 |
| 4,443,747 | 4/1984 | Chausse et al. | 318/809 |
| 4,490,780 | 12/1984 | Nondahl | 363/87 |
| 5,103,152 | 4/1992 | Tsurumaki | 318/764 |
| 5,621,296 | 4/1997 | Werner et al. | 318/768 |

FOREIGN PATENT DOCUMENTS

6-335254  12/1994  Japan .

*Primary Examiner*—Matthew Nguyen
*Attorney, Agent, or Firm*—Antonelli, Terry, Stout & Kraus, LLP

[57] ABSTRACT

A sine wave input converter provided with a phase sequence computation unit which inputs two line voltages or two phase voltages of the three phase ac power supply, computes the phase of a sine wave voltage of one of these two inputs, and determines on the basis of computation using these two input voltages and the phase whether the phase sequence is positive or antiphase, which is determined depending on whether the result of computation assumes a constant value, or becomes a sine wave oscillating between positive and negative values. Power supply interruption can be determined from the same computation result.

20 Claims, 9 Drawing Sheets

VOLTAGE-PHASE RELATION

FIG. 3 (b)

LINE VOLTAGE-PHASE RELATION

FIG. 3 (c)

RESULT OF Vq COMPUTATION

FIG. 4 (a)

VOLTAGE-PHASE RELATION

FIG. 4 (b)

LINE VOLTAGE-PHASE RELATION

FIG. 4 (c)

RESULT OF Vq COMPUTATION

FIG. 5 (a)

U-PHASE GROUND

FIG. 5 (b)

V-PHASE GROUND

FIG. 5 (c)

W-PHASE GROUND

ELECTRIC POWER CONVERSION APPARATUS

BACKGROUND OF THE INVENTION

The present invention relates to an electric power conversion apparatus, such as a converter and an inverter.

A power conversion apparatus having a structure of a built-in three phase ac sine wave input converter is disclosed in JP-A No. 6-335254, in which an uninterruptible power supply is described. This power conversion apparatus is comprised of a circuit which includes: switching devices in bridge connection which are coupled to a three phase ac power supply via a reactor; a capacitor coupled to the output of the converter for producing a dc voltage; a pulse wave generator for generating a pulse wave in synchronism with the power supply voltage across these switching devices in bridge connection using the dc voltage; and means for conducting a sine wave current through the reactor in synchronism with the phase voltage of the power supply by controlling the pulse wave, thereby reducing harmonic components contained in the input current.

In the above described power conversion apparatus having a three phase ac input and a sine wave input converter which controls an input current to become a sine wave in synchronism with an input voltage, and an inverter which outputs an ac voltage which is in synchronism with the input power voltage, there is a problem in that prior to coupling the electric power conversion apparatus to the three phase ac power supply, it was necessary to determine the direction of phase rotation in advance, and then to couple the apparatus in the phase sequence as designated. This procedure is required in order to synchronize the power synchronizing circuit within the electric power conversion apparatus with the frequency and phase of the input power supply. Hence, when the apparatus is coupled in an antiphase configuration, it is not able to operate normally due to the out-of-phase condition. However, it is difficult to determine whether the phase sequence is correct or not until the apparatus is actually started, and this has been one of the factors which prevented easy handling of the electric power conversion apparatus.

SUMMARY OF THE INVENTION

The present invention has been contemplated to solve the above-mentioned problems associated with the prior art, which arise when coupling the three phase ac power input electric power converter apparatus to its power supply.

In order to solve the above-mentioned problems, the electric power conversion apparatus according to the invention is provided with a display means which displays an input power supply status. Then, by determining whether the phase sequence is positive or negative and displaying its result, coupling error in the phase sequence can be avoided, thereby facilitating easier handling of the power conversion apparatus.

More specifically, a means for detecting two line voltages or two phase voltages of the three phase ac voltages of the input power supply are provided according to the invention. Assuming that the three phases of the ac power supply are U, V and W phases, and that the detected voltages are line voltages Vuv and Vwv, the following equations (1) and (2) can be obtained.

$$V\alpha = (2 \cdot Vuv - Vwv)/\sqrt{3} \tag{1}$$

$$v\beta = Vwv \tag{2}$$

On the other hand, phase θwv of the voltage Vwv can be obtained in the following manner.

Firstly, a sine wave voltage Vwv is amplified and is passed through a plus/minus limiter to produce a pulse wave. Then, a trigger signal is produced which becomes a high level only at the rise (edge) time of this pulse wave and becomes a low level other than that. Further, an integrator is provided for computing phase θ by integrating a value obtained by subtracting Δψ(initial value=0) from a reference frequency ψref. When the above-mentioned trigger signal becomes high level, the phase θ which has been output from the integrator is amplified to be used as a new Δψ. When a series of this value computation is repeated using this, θ converges to the phase θwv of voltage Vwv.

Then, the following computation is executed using θwv obtained above and equations (1) and (2).

$$Vq = V\beta \cdot \sin \theta wv - V\alpha \cdot \cos \theta wv \tag{3}$$

A value of Vq obtained by equation (3) equals a crest value of a line voltage of the input power when its phase sequence is U-phase→V-phase→W-phase. Namely, in the case where its power supply is 200 V three phase ac, Vq takes a constant value of approximately 283 V. However, in the case where its phase sequence is U-phase→W-phase→V-phase, Vq becomes a sine wave which has a frequency which is twice the power supply frequency and a crest value of approximately ±283 V. Therefore, the phase sequence can be determined through computation of Vq. Further, when the U-phase or W-phase is grounded, Vq becomes a sine wave which has a frequency which is twice the power supply frequency, and an amplitude which oscillates between +300 and −20 V. Still further, when the V-phase is grounded, Vq becomes a sine wave which oscillates between +100 and approximately +283 V. Of course, when all the three phases of the power supply are interrupted, Vq becomes zero, therefore, through monitoring of Vq, the phase sequence of connection to the power supply as the well as status of power interruption can be detected specifically.

Further, the same result can be obtained as well by means of a phase voltage detection method using the following equations. In the case of detecting the phase voltages Vu and Vw from U-phase, V-phase and W-phase, equations (4) and (5) are used.

$$V\alpha = \sqrt{3} \cdot Vu \tag{4}$$

$$V\beta = Vu + 2 \cdot Vw \tag{5}$$

Further, in the same manner that the phase θwv was obtained using Vwv, phase θu is computed using Vu. Then, using this value of θu as well as Vα and Vβ obtained by equations (4) and (5), Vq is computed as follows.

$$Vq = V\alpha \cdot \sin \theta u - V\beta \cdot \cos \theta u \tag{6}$$

Vq obtained by equation (6) has the same property as that obtained by equation (3).

According to still another aspect of the invention, an electric power conversion apparatus which can operate normally independent of the phase sequence of connection to the input power supply is provided, which aparatus is enabled through provision of a phase sequence determination means for determining the phase sequence to the input power as described above, and change-over switches for switching feedback values to the control circuits of the converter or inverter and switching gate pulses such that they coincide with the current status of the phase sequences.

By provision of the power conversion apparatus having means for determining the phase sequence of connection to the three phase ac power supply and whether or not the power supply is interrupted according to the invention, the following advantages have been attained. Power connection of the power conversion apparatus to the power supply can be easily confirmed. Malfunction of the sine wave converter and the like which cannot operate normally in antiphase (i.e., negative phase) connection can be prevented. Further, an uninterruptible power supply or sine wave input converter equipment that can operate normally independently of the phase sequence of the three phase ac power supply can be provided. This power conversion equipment of the invention can be easily installed, ensures normal operation free of malfunction due to the wrong phase sequence, and improves the ease of use of the power conversion equipment utilizing the uninterruptible power supply or sine wave input converter.

BRIEF DESCRIPTION OF THE DRAWINGS

Other features and advantages of the invention will be apparent from the following description taken in connection with the accompanying drawings wherein.

PREFERRED EMBODIMENTS

Embodiment 1

Figure 1:
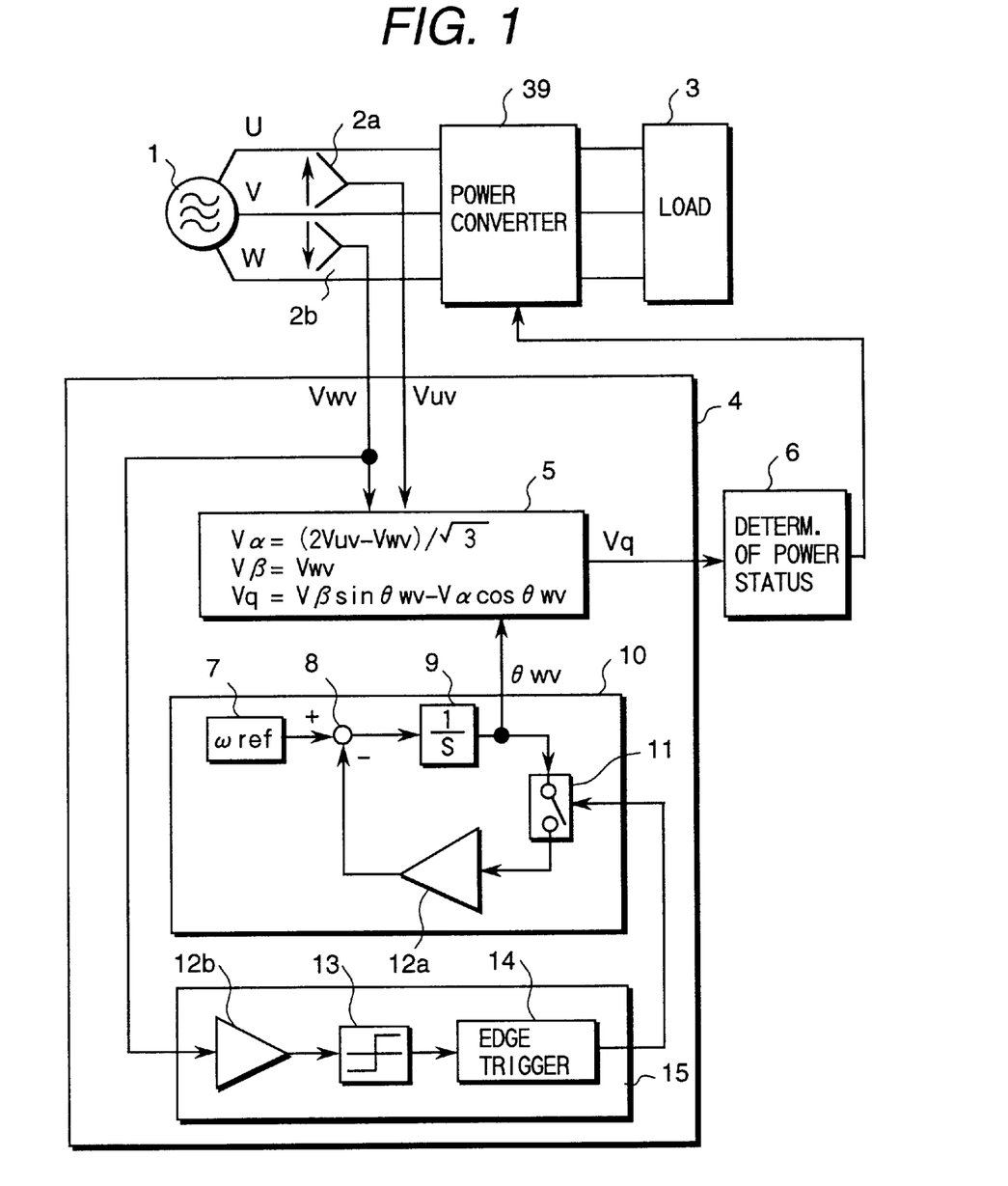
FIG. 1 is a schematic block diagram indicating an electric power conversion apparatus representing a first embodiment of the invention.

A first embodiment of the invention will be described in detail with reference to FIGS. 1–5. FIG. 1 is a schematic block diagram indicating a basic architecture of the present invention. In FIG. 1, the appartus includes 1 is a three phase ac power supply, 2a and 2b are voltage detection means, 3 is a load, 4 depicts a power supply status computing unit, 5 is a Vq computing unit, 6 is a power supply status determination unit, 7 is a reference frequency generator, 8 is a subtracter, 9 is an integrator, 10 is a phase computing unit, 11 is a sampler, 12a and 12b are amplifiers, 13 is a limiter, 14 is an edge trigger circuit, 15 is a zero-cross circuit, and 39 is an electric power converter.

In FIG. 1, three phase ac power supply 1 is connected to load 3 via power converter 39. Three phase ac power supply 1, which includes U, V and W phases, is provided with voltage detection means 2a connected between U and V phases, and voltage detection means 2b connected between W and V phases. Outputs from voltage detection means 2a and 2b are supplied to the power supply status computing unit 4. The power supply status computing unit 4 is comprised of Vq computing unit 5, phase computing unit 10 and zero-cross circuit 15. The outputs from voltage detection means 2a and 2b are supplied to Vq computing unit 5. The zero-cross circuit 15 is comprised of amplifier 12b, limiter 13 and edge trigger circuit 14, connected in series in this order. As an input to zero-cross circuit 15, an output from voltage detection means 2b is connected thereto. Phase computing unit 10 is comprised of reference frequency generator 7, subtracter 8, integrator 9, sampler 11 and amplifier 12a. Reference frequency generator 7 is connected to the plus side of subtracter 8, and an output from subtracter 8 is supplied to integrator 9. An output from integrator 9 is connected to sampler 11. An output from sampler 11 is connected to amplifier 12a, and an output from amplifier 12a is connected to the minus side of subtracter 8. Further, an output from zero-cross circuit 15 is connected to sampler 11. Further, an output from integrator 9 is connected to the Vq computing unit 5. An output from the Vq computing unit 5 is input to power supply status determination unit 6, and an output from the power supply status determination unit 6 is connected to power converter 39.

Figure 2:
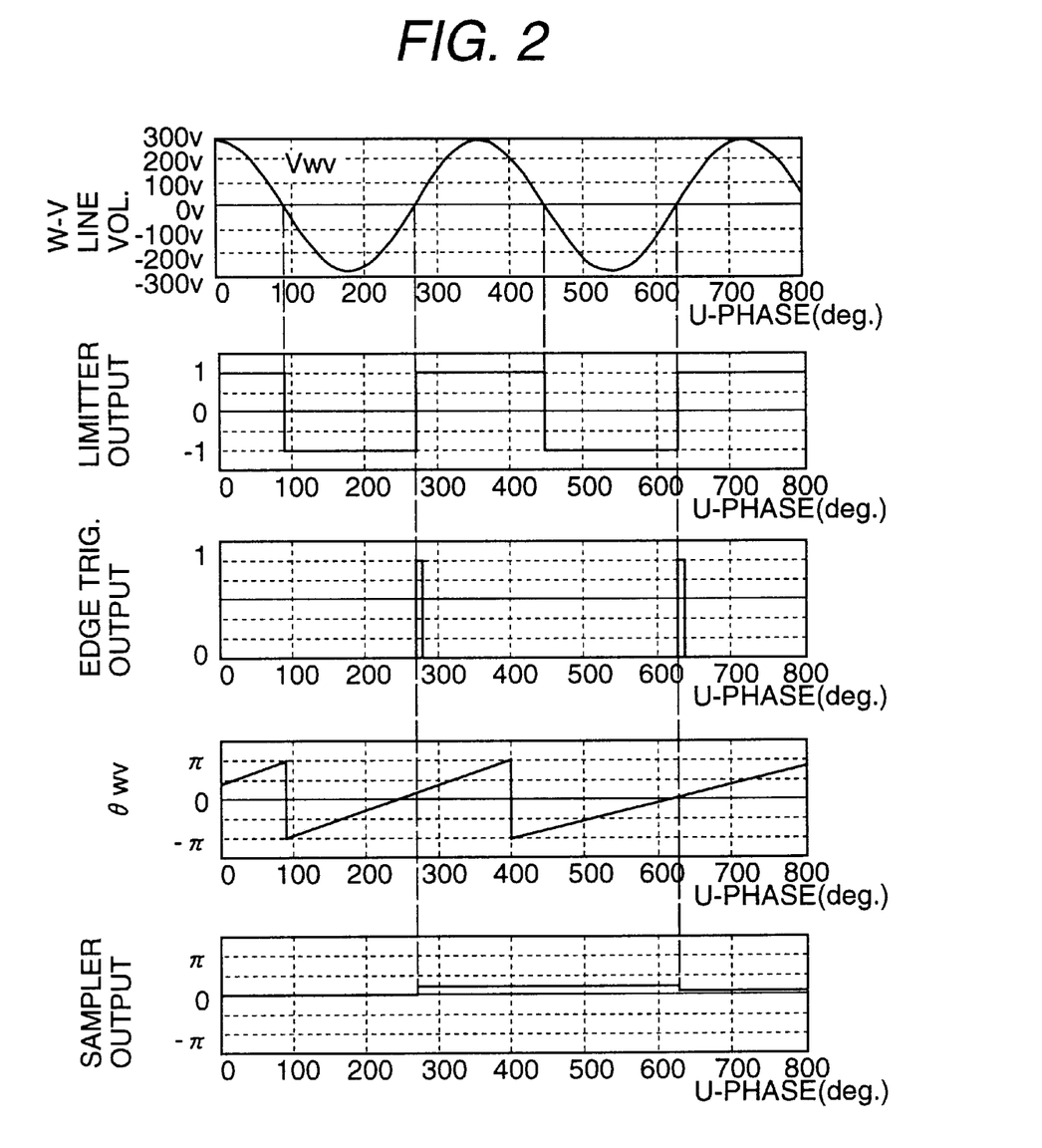
FIG. 2 is a diagram of respective wave forms indicative of functions of respective circuits described in FIG. 1.
Figure 3:
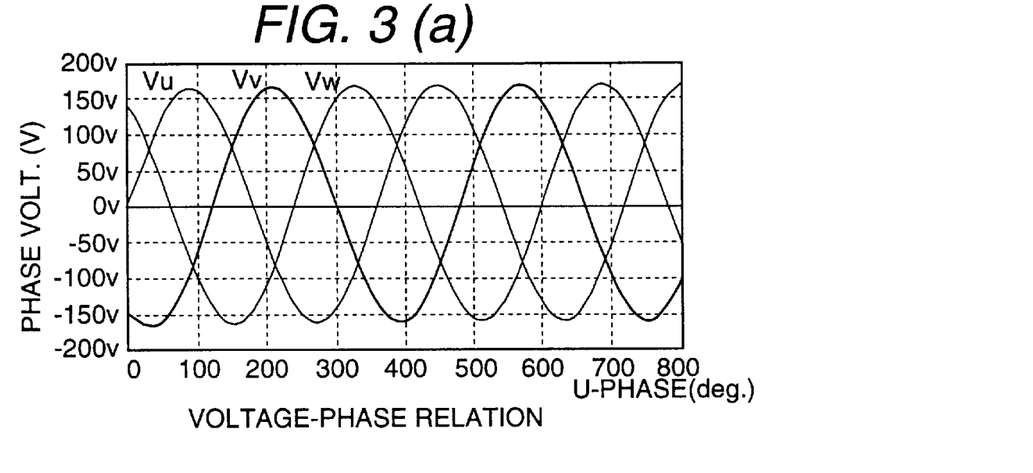
FIGS. 3(a) to 3(c) are diagrams indicating a result of computation of Vq when the phase sequence of the input power supply is U→V→W.
Figure 4:
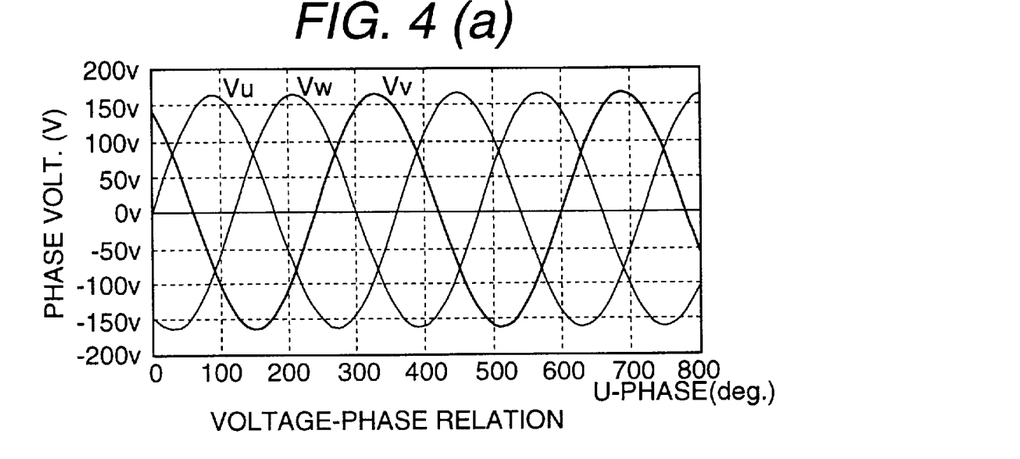
FIGS. 4(a) to 4(c) are diagrams indicating a result of computation of Vq when the phase sequence of input power supply is U→W→V.
Figure 5:
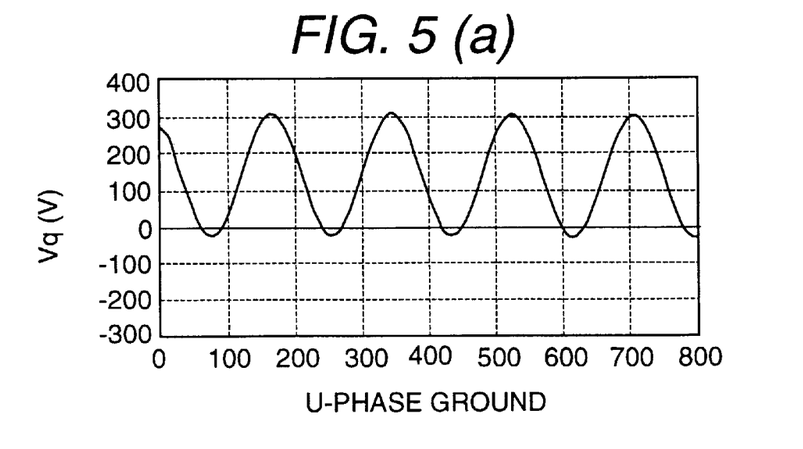
FIGS. 5(a) to 5(c) diagrams indicating a result of computation of Vq when one of the phases of input power supply is grounded.

Now, the functions of the circuit of FIG. 1 will be described. Three phase ac power supply 1 provides 200 V, and its phase voltages Vu, Vv and Vw have a sine wave form with a crest value of approximately 163 V, as depicted in FIG. 3(a). Further, its line voltages Vuv and Vwv have a wave form with a crest value of approximately 283 V depicted in FIG. 3(b). Power converter 39, which is connected between three phase ac power supply 1 and load 3, controls the electric power to be supplied to load 3. Voltage detection means 2a and 2b detect line voltages Vuv, and Vwv respectively, and apply detected values to power supply status computing unit 4. Vwv is input amplifier 12b within the zero-cross circuit 15. Vwv is amplified in amplifier 12b, then is formed into a square wave by limiter 13. A relationship between Vwv and its output wave form from limiter 13 is depicted in FIG. 2, where, when Vwv is positive, the output of the limiter 13 becomes 1, and when Vwv is negative, the output of the limiter 13 becomes −1. The output from limiter 13 is input to edge trigger circuit 14. Edge trigger circuit 14 receives an output in the form of a square wave from limiter 13, and outputs a signal having a wave form which becomes high level only when the square wave rises from negative to positive and remains low level other than that. The relationship between these wave forms is indicated in FIG. 2. The output from edge trigger circuit 14 is used as a trigger signal for the sampler 11 within the phase computing unit 10.

Now, the function of the phase computing unit 10 will be described. Reference frequency generator 7 outputs a reference frequency corresponding to the frequency of the power supply. FIG. 2 depicts a case of 50 Hz, and in which ωref is 314.16(rad/s). The input to the negative side of subtracter 8 is an output from amplifier 12a. Assuming this output from amplifier 12a to be Δω, a value obtained by subtracting Δω from ωref is input to integrator 9. An output from integrator 9 is the phase θwv. However, when the value of θwv exceeds π(rad), it is updated by a value which is obtained by subtracting 2π from the value of θwv, thereby the wave form of θwv becomes a saw-tooth ramp wave rising from the left to the right between −π and π as indicated in FIG. 2. Since the switch of sampler 11 is closed only when the output wave form of edge trigger circuit 14 becomes high level, a value of θwv at the high level of the edge trigger output is held. An output wave form from sampler 11 becomes as depicted at the bottom of FIG. 2. Then, this value is input to amplifier 12a. An output from amplifier 12a becomes a value corresponding to an input to the sampler 11, and when the output from sampler 11 is positive, the frequency ω to enter integrator 9 becomes smaller. By means of this circuit 10, the phase θwv is controlled to become equal to the phase of the Vwv of input power supply. Then, in the Vq computing unit 5, the following arithmetic operation is executed using Vuv, Vwv and θwv described above.

$$V\alpha = (2 \cdot Vuv - Vwv)/\sqrt{3}$$

$$V\beta = Vwv$$

$$Vq = V\beta \cdot \sin \theta wv - V\alpha \cdot \cos \theta wv.$$

When θwv is in synchronism with the phase Vwv of the power supply, Vq computed by the above-mentioned equations has one of the wave forms depicted in FIGS. 3(a)–3(c), 4(a)–4(c) and 5(a)–5(c).

FIGS. 3(a)–3(c) represent a case where the phase sequence of connection to the three phase ac power supply 1 is in the order of U-phase→V-phase→W-phase, as indicated in FIG. 3(a), and the phase relation between Vuv and Vwv becomes as shown in FIG. 3(b). Vq at this time takes a constant value of approximately 283 V.

On the other hand, in the case where the phase sequence of the three phase ac power supply 1 is in the order of U-phase→W-phase→V-phase, its wave forms become as indicated in FIG. 4(a). A phase relationship between the line voltages Vuv and Vwv in FIG. 4(b) becomes opposite to that of the case of FIG. 3(b), and Vq has a wave form as indicated in FIG. 4(c) which oscillates approximately between ±283 V. The frequency of Vq is twice the power supply frequency.

Further, the wave forms of Vq depicted in FIGS. 5(a)–(c) represent the case when either one of the U, V and W-phases is grounded. More specifically, FIG. 5(a) depicts grounding of the U-phase where Vq becomes a sine wave oscillating between −20 and +300 V. FIG. 5(b) depicts grounding of the V-phase where Vq becomes a wave form oscillating between 100 V and approximately 283 V. FIG. 5(c) depicts grounding of the W-phase where Vq becomes a sine wave oscillating between −20 and +300 V similar to the case of the U-phase being grounded.

Thereby, as described above, by monitoring the wave form of Vq, it becomes possible to determine various conditions the three phase ac power supply 1. Power supply status determination unit 6 in FIG. 1 thus determines the power supply conditions using Vq. Namely, when Vq is constant, it is determined that the phase sequence of the three phase ac power supply 1 is in the order of U→V→W-phases, and that its line voltage crest value is equal to the value of Vq. On the other hand, when Vq becomes a sine wave oscillating between the same plus and minus crest values, it is determined that the phase sequence thereof is in the order of U→W→V-phases, and that its line voltage crest value is equal to the peak value of Vq. Further, when Vq oscillates sinusoidally between plus and minus values, and has a positive off-set value, it is considered that either of the U or W phases is grounded. Still further, when Vq oscillates significantly within a range of positive values, it is supposed that V-phase is grounded.

A result of determination as to the status of the power supply by power supply status determination unit 6 is input into power converter 39 and is used for controlling the operation thereof. For example, a sine wave input converter which operates normally only when its phase sequence is in the order of U→V→W phases, namely, when the value of Vq is positive and constant, as indicated in FIG. 3(c), is allowed to operate under such conditions, and can be prevented from operating when Vq has a wave form as indicated in FIG. 4(c), since the phase sequence thereof is determined to be antiphase (i.e., negative phase), thereby protecting the converter against the antiphase (i.e., negative phase) operation. Further, when Vq has a wave form as indicated in FIG. 5(c), the operation of the converter is interrupted since it is assumed that one of the phases has been grounded.

Further, in the case where power converter 39 is an uninterruptible power supply, and when Vq becomes a wave form as indicated in FIG. 5(c), it is handled as a power supply interruption condition, thereby stopping power supply from the three phase ac power supply 1 to the load 3, and the power supply to the load 3 is switched to a battery supply, the dc power of which is inverted to ac by the inverter.

By obtaining the value of Vq through computation as described hereinabove, the operational condition of the power converter 39 which supplies power to the load can be controlled.

By way of example, the functions of the power supply status computing unit 4 and the power supply status determination unit 6 can be realized simply by software.

Embodiment 2

Now, a second embodiment of the invention, which detects phase voltages of an input power supply, will be described with reference to FIG. 6. The same reference numbers as in FIG. 1 are given to the same circuits and units in FIG. 6.

Figure 6:
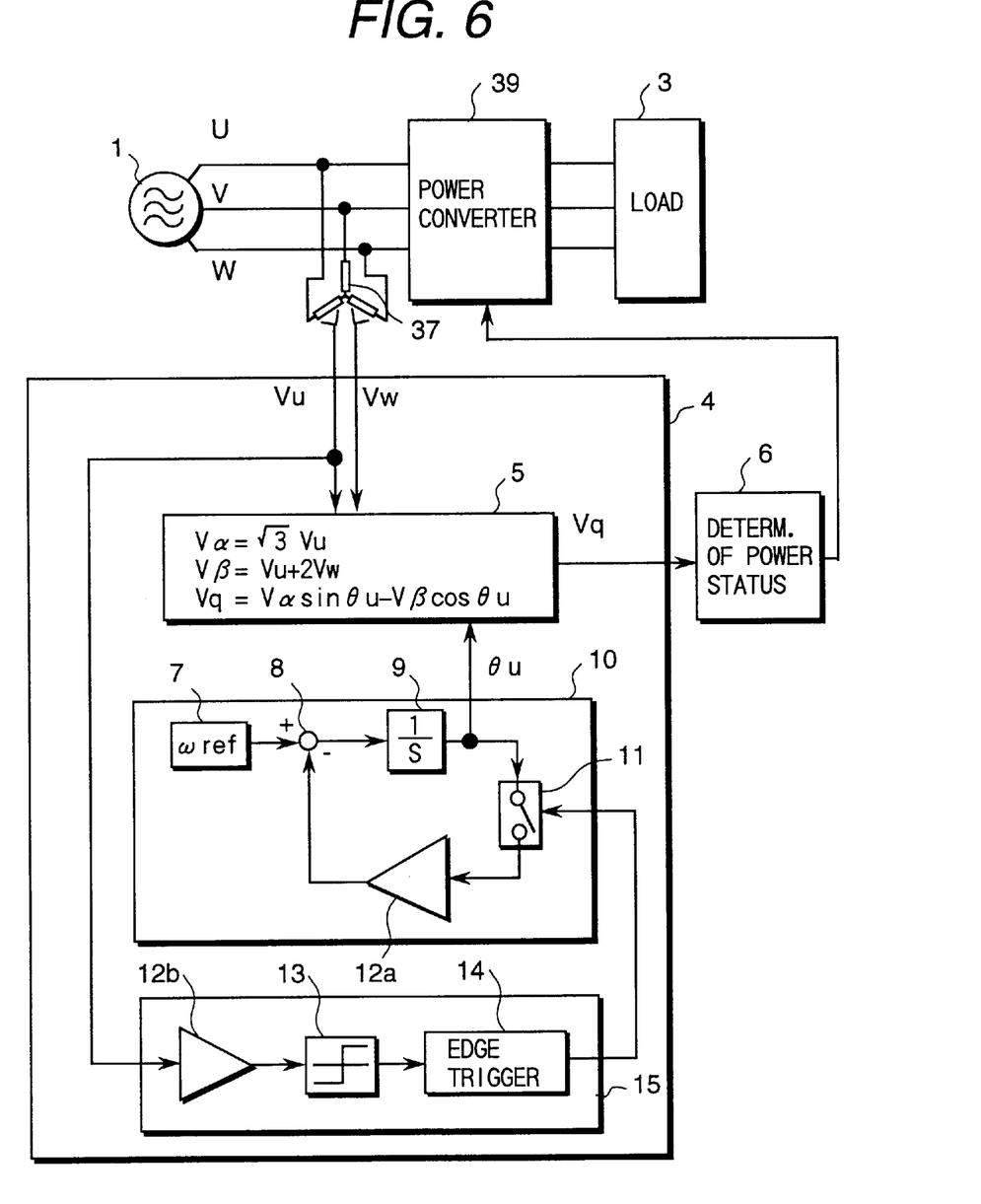
FIG. 6 is a schematic block diagram of an electric power conversion apparatus according to a second embodiment of the invention.

In FIG. 6, numeral 37 depicts a phase voltage detection means. FIG. 6 differs from FIG. 1 only in the following four points: a phase voltage detection means 37 is inserted between the three phase ac power supply 1 and power converter 39 for detecting the phase voltages Vu and the Vw; computing equations used in the Vq computing unit 5 are different; the input to zero-cross circuit 15 is changed from Vwv to the U-phase voltage Vu; and the phase output from phase computing unit 10 is changed to θu.

The features of the embodiment of FIG. 6 will be described in particular with respect to the main differences described above. The phase voltages Vu and Vw of the three phase ac power supply 1 are detected by phase voltage detection means 37 and the input to power supply status computing unit 4. The detected phase voltage Vu is input to the zero-cross circuit 15, and consequently a signal having a wave form which becomes high level only at a zero-cross point of the U-phase voltage changing from negative to positive is output from the edge trigger circuit 14. The function of the phase computing unit 10 is basically the same as that of the first embodiment of the invention, except that the phase of the output from integrator 9 becomes in synchronism with the phase θu of the U-phase, since the trigger signal to sampler 11 is in synchronism with the zero-cross point of the U-phase.

Vq computing unit 5 which receives Vu, Vw and θu executes the following computation.

$$V\alpha = \sqrt{3} \cdot Vu$$

$$V\beta = Vu + 2 \cdot Vw$$

$$Vq = V\alpha \cdot \sin \theta u - V\beta \cdot \cos \theta u$$

A value of Vq obtained as described above has the same property as the value of Vq obtained in the first embodiment of the invention. However, when the V-phase voltage is grounded in this second embodiment of the invention, the wave form of vq as indicated in FIG. 5(b) is not obtained, but it remains as indicated in FIG. 3(c).

The second embodiment of the invention can be applied as well to the operation of the power conversion apparatus in the same manner as the first embodiment. For example, for a sine wave input power converter which can operate normally only when its phase sequence is in the order of U→V→W phases, it is allowed to operate only when the value of Vq is positive and constant, namely, only when in the condition of FIG. 3(c), and its operation is prevented by suppressing the gate when Vq has a wave form of FIG. 4(c) which is determined as an antiphase condition, thereby protecting the converter against an antiphase input. Further, when Vq has a wave form of FIGS. 5(a) or 5(c), since one of the phases is indicated to be grounded, a converter stop operation is executed.

Also, in this second embodiment of the invention, the functions of the power supply status computing unit 4 and the power supply status determination unit 6 in FIG. 6 can be easily realized by software.

Embodiment 3

Figure 7:
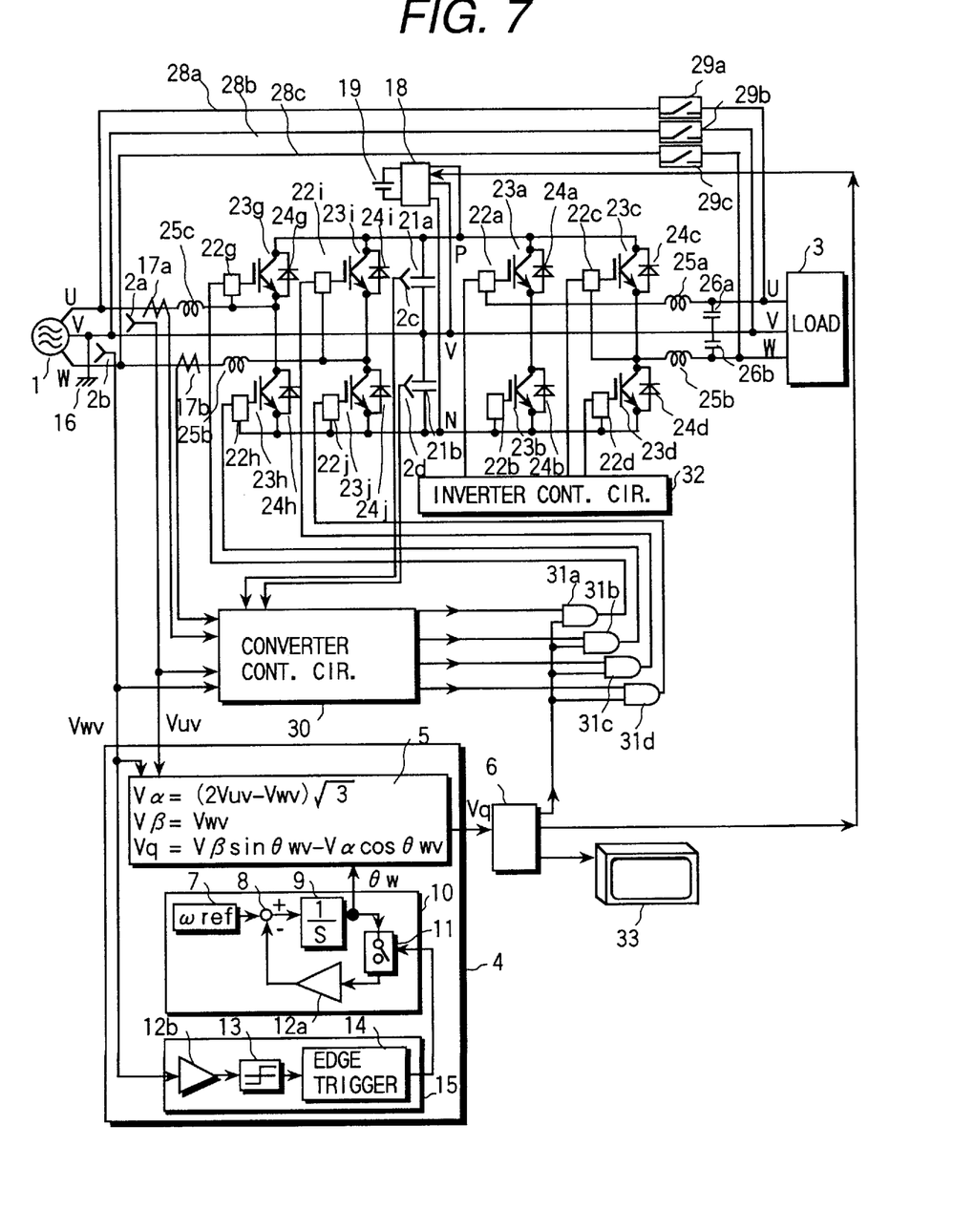
FIG. 7 is a schematic block diagram of an uninterruptible power supply according to a third embodiment of the invention.

Now, with reference to FIG. 7, a third embodiment of the invention will be described. FIG. 7 is a schematic block diagram indicating an uninterruptible power supply comprised of a V-connection inverter and converter, and a battery. Circuits and units in FIG. 7 having the same functions as in FIG. 1 are depicted by the same reference numerals. Other elements in FIG. 7 are indicated as follows. 2c, 2d: voltage detection means, 16: ground, 17a, 17b: current detection means, 18: DC-DC converter, 19: battery, 21a, 21b: capacitors, 22a–22d and 22g–22j: drive circuits, 23a–23d and 23g–23j: switching devices, 24a–24d and 24g–24j: diodes, 25a–25d: reactor, 26a, 26b: capacitors, 28a–28c: by-pass lines, 29a–29c: switches, 30: converter control circuit, 31a–31d: AND circuits, 32: inverter control circuit, and 33: a display unit.

In FIG. 7, the three phase ac power supply 1 is a 200 V power supply. The U and W phases of this power supply are connected to reactors 25c and 25d, respectively. The V phase thereof is connected directly to ground 16 and to the V phase input of load 3. This V phase potential is defined as point V. Pairs of switching devices 23a and 23b, 23c and 23d, 23g and 23h, and 23i and 23j are connected in series, respectively. All of the switching devices 23a, 23c, 23g and 23i on the side of the high potential are connected together. This point of connection is defined as point P. All of the switching devices 23b, 23d, 23h and 23j on the side of the low potential are connected together. This point of connection is defined as point N. Further, switching devices 23g–23j are provided with diodes 24g–24j, respectively, which are in reverse parallel connection. In addition, switching devices 23a–23d and 23g–23j, are provided with drive circuits 22a–22d and 22g–22j respectively, which are connected to respective control terminals thereof. Switching devices 23a–23d and diodes 24a–24d in combination constitute a V-connection inverter, and inverter control circuit 32 is connected to drive circuits 22a–22d. An interconnection between switching devices 23a and 23b, which is a first output node of this inverter, is connected to one terminal of reactor 25a. An interconnection between switching devices 23c and 23d, which is a second output node of this inverter, is connected to one terminal of reactor 25b. Other terminals of reactors 25a and 25b are connected to U-phase and W-phase input terminals of the load 3, respectively. Further, capacitors 26a and 26b are inserted respectively between U and V phases, and between W and V phases of load 3.

On the other hand, switching devices 23g–23j and diodes 24g–24j in combination constitute a V-connection converter. Further, an interconnection between switching devices 23g and 23h, which is a first input node to this converter is connected to a reactor 25c. An interconnection between switching devices 23i and 23j, which is a second input node to the converter, is connected to a reactor 25d.

Further, a capacitor 21a is inserted between point P and point V, and a capacitor 21b is inserted between point V and point N. Still further, battery 19 is connected to the points P, V and N via DC-DC converter 18.

By-pass lines 28a–28c are provided between the three phase ac power supply 1 and the load 3, which connect U, V and W phases of the ac power supply and U, V and W phase input terminals of the load via respective switches 29a–29c. Voltage detection means 2a and 2b are connected, respectively, between U and V phases, and W and V phases of the three phase ac power supply 1, and their outputs are input to the converter control circuit. Further, current detection means 17a and 17b are inserted between the U phase of the three phase ac power supply 1 and the reactor 25c, and between the W phase of the three phase ac power supply 1 and the reactor 25d, respectively, and their outputs are input to the converter control circuit 30. In addition, voltage detection means 2c and 2d are connected across the terminals of capacitors 21a and 21b, respectively, and their outputs are input to the converter control circuit 30. Further, the outputs from voltage detection means 2a and 2b are also input to the power supply status computing unit 4. An output from the power supply status computing unit 4 is connected to the power supply status determination unit 6, an output of which is connected to one of the input terminals of each one of the AND circuits 31a–31d. Outputs from converter control circuit 30 are connected to drive circuits 22g–22j, respectively; through the other one of the input terminals of a respective one of AND circuits 31a–31d. The output from power supply status determination unit 6 is also input to display unit 33. The output from power supply status determination unit 6 is also supplied to DC-DC converter 18. The internal structure of the power supply status computing unit 4 is the same as that of the first embodiment of the invention depicted in FIG. 1.

Now, the operation of the third embodiment of the invention will be described. Converter control circuit 30 receives line voltages Vuv and Vwv of the input voltage via voltage detection means 2a and 2b. Further, converter control circuit 30 enters voltages Vpv and Vvn detected across respective capacitors 21a and 21b from voltage detection means 2c and 2d, and also receives input currents Iu and Iw flowing through reactors 25c and 25d detected by current detection means 17a and 17b, respectively. Using these values, converter control circuit 30 controls input currents Iu and Iw such that they become sine waves which are in synchronism with phase voltages Vu and Vw while maintaining the dc voltage Vdc, which is a sum of Vpv and Vvn, at a constant value. This control can be achieved through PWM operation of the switching devices 23g–23j which constitute the converter. At this time, since ON/OFF signals for switching devices 23g–23j are transmitted from converter control circuit 30 to their drive circuits 22g–22j through AND circuits 31a–31d, the converter is allowed to operate only when the input to the other one of the input terminals of the each of the AND circuits 31a–31d is at the high level.

On the other hand, inverter control circuit 32 transmits drive signals to the drive circuits 22a–22d to turn ON and OFF switching devices 23a–23d, thereby in consequence causing sine wave voltages to appear at the U, V and W phase input terminals of the load.

While the converter is in operation, DC-DC converter 18 operates to charge battery 19 using Vpv and Vvn. When operation of the converter is stopped, the DC-DC converter, with power supplied from the battery, operates to output a constant dc voltage to Vpv and Vvn. Further, when the inverter fails in its operation for some reason such as malfunction or overcurrent, switch means 29a–29c are switched on to supply power directly from three-phase ac power supply 1 to load 3 via by-pass lines 28a–28c.

The converter control circuit ensures that the converter will operate normally as a sine wave input converter only when the phase sequence of the three-phase ac power supply is in the sequence of U→V→W phases. In this phase sequence, the value of Vq output from power supply status computing unit 4 becomes a constant value of approximately 283 V, as indicated in FIG. 3(c). In this case, power supply status determination unit 6 judges the connection to be a positive phase connection in accordance with the value of Vq, and outputs a high level to the AND circuits 31a–31d. Accordingly, the converter can operate in accordance with an output signal from the converter control circuit 30. Further, display unit 33 displays an indication that the power supply is correctly connected, thereby confirming the phase sequence.

On the other hand, in the case where the phase sequence is in the order of U→W→V phases, the converter is not allowed to operate normally due to the structure of the converter control circuit 30. In this case, Vq which is output from power supply status computing unit 4 becomes a sine wave having an amplitude of approximately ±283 V, as indicated in FIG. 4(c). Hence, power supply status determination unit 6 determines according to this sine wave that the power supply connection is antiphase, thereby outputting a low level to AND circuits 31a–31d. As a result, switching devices 23g–23j which constitute the converter are in the off-state, thereby not responding to the output signal from converter control circuit 30, and thereby causing the converter to not operate. Further, display unit 33 displays information indicating that the phase sequence of the connection to the power supply is antiphase. From this display of information indicating an antiphase connection, one can be quickly informed of the necessity to check and correct the wiring to the power supply.

Further, when a failure in the three-phase ac power supply 1 occurs in spite of the fact that the phase connection to the three-phase power supply 1 is correct and the converter is operating normally, Vq changes from the constant value of approximately 283 V to either of the wave forms of FIGS. 5(a)–(c), or to zero. Thereby, it is possible to determine the occurrence of power failure from the changes in Vq as stated above. In either case, by observing the changes of Vq, the output from the power supply status determination unit 6 to AND circuits 31a–31d is switched from the high level to the low level so as to stop the operation of the converter, and at the same time, the operation of the DC-DC converter 18 is switched from the charging of battery 19 to the discharging thereof, so that the dc voltage between P and V, and V and N is controlled to be constant. Through this switching of the operation, a stable ac voltage can be supplied to load 3.

Also, in the circuit of FIG. 7 of this embodiment of the invention, the functions of the power supply status computing unit 4, power supply status determination unit 6, converter control circuit 30, inverter control circuit 32 and AND circuits 31a–31d can be readily implemented by software.

Embodiment 4

Now, a fourth embodiment of the invention will be described with reference to FIG. 8, which depicts a schematic block diagram of an uninterruptible power supply which uses a V-connection converter, V-connection inverter, by-pass lines, and battery similar to FIG. 7, and is capable of operating normally even with an antiphase connection.

Figure 8:
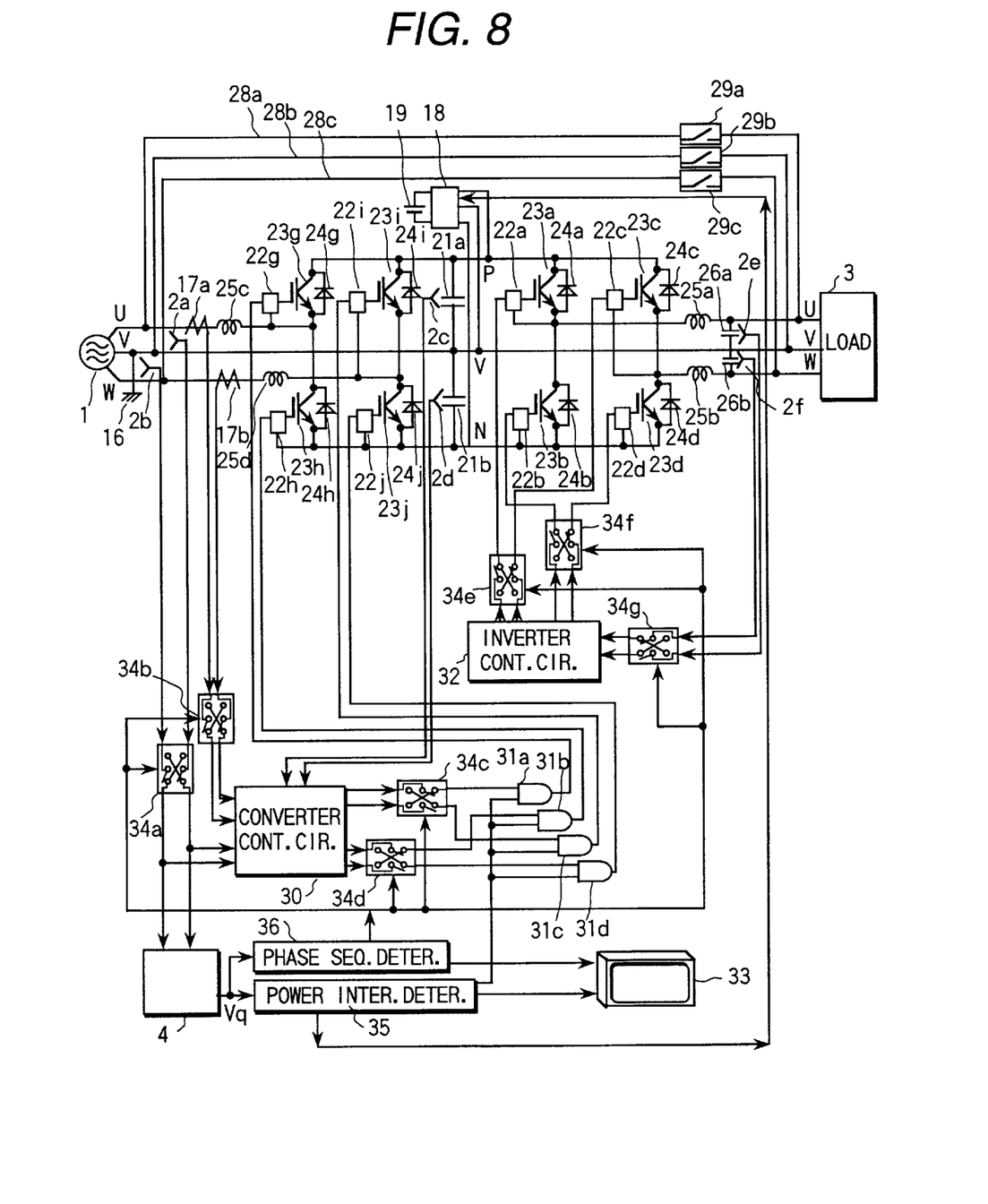
FIG. 8 is a schematic block diagram of an uninterruptible power supply according to a fourth embodiment of the invention.

In FIG. 8, the same circuits and components having the same functions as in FIGS. 1 and 7 are identified by the same reference numbers and symbols, wherein 34a–34g depict change-over switches, 35 depicts a power supply failure determination unit, and 36 depicts a phase sequence determination unit.

The main difference in FIG. 8 from FIG. 7 resides in the fact that the power supply status determination unit 6 in FIG. 7 is separated into two parts including a power supply failure determination unit 35 and a phase sequence determination unit 36. Other differences involve inserting a change-over switch 34a between the voltage detection units 2a, 2b and both the converter control circuit 30 and the power supply status computing unit 4, and inserting a change-over switch 34b between the current detection units 17a, 17b and the converter control circuit 30. Also, a change-over switch 34c is inserted between converter control circuit 30 and the AND circuits 31a, 31c, and a change-over switch 34d is inserted between converter control circuit 30 and the AND circuits 31b and 31d. Further, a change-over switch 34g is inserted between voltage detectors 2e and 2f and the inverter control circuit 32. A change-over switch 34e is inserted between inverter control circuit 32 and the drive circuits 22a and 22c, and also, a change-over switch 34f is inserted between the inverter control circuit 32 and the drive circuits 22b and 22d. Then, respective change-over switches 34a–34g are connected with phase sequence determination unit 36. Further, the power supply failure determination unit 35 is connected with display unit 33, AND circuits 31a–31d and DC-DC converter 18, respectively. Phase sequence determination unit 36 is also connected to the display unit 33.

Now, the functions and operation of the fourth embodiment of the invention will be described in the following. The functions of this embodiment as an uninterruptible power supply unit are approximately the same as those of FIG. 7. A V-connection converter comprising switching devices 23g–23j and diodes 24g–24j is adapted to control an input current to become a sine wave form in synchronism with the power supply voltage. Then, a dc voltage is produced between points P and V, and points V and N, which dc voltage is converted by the DC-DC converter 18 to charge battery 19. Further, this dc voltage produced between points P and V, and points V and N is inverted by a V-connection inverter comprising switching devices 23a–23d and diodes 24a–24d to a sine wave ac current to be supplied to load 3.

A phase sequence of the three-phase ac power supply 1 is detected by voltage detectors 2a and 2b, and a result of detection is input to both the power supply status computing unit 4 and the converter control circuit 30 via change-over switch 34a. Change-over switches 34a–34g are provided for changing-over between two inputs, namely, to change the sequence of the two outputs. No change-over in the output sequence is defined as a through state, and a reversal in the output sequence is defined as a cross state. Selection between these two states is determined by an output from phase sequence determination unit 36, wherein an output of high level from phase sequence determination unit 36 corresponds to the through state, and an output of low level therefrom corresponds to the cross state.

Under initial conditions, the output from phase sequence determination unit 36 is at the high level, and change-over switches 34a–34d are in the through state. Vuv and Vwv input terminals of the power supply state computing unit 4 are connected to outputs from the voltage detection means 2a and 2b, respectively. Outputs from the current detection means 17a and 17b are input to converter control circuit 30 as Iu and Iw, respectively. Further, an inter UV control signal which is an output signal from converter control circuit 30 is transmitted to drive circuits 22g and 22h via AND circuits 31a and 31b, and an inter WV control signal therefrom is transmitted to drive circuits 22i and 22j via AND circuits 31c and 31d, respectively. Since the converter is in the state of connection as described above, if the phase sequence of three phase ac power supply 1 is in the sequence of U→V→W phases and an effective value of line voltage of three phase ac power supply 1 is 200 V, Vq becomes constant approximately at 283 V. In this case, an output from power supply failure determination unit 35 to AND circuits 31a–31d is high level. Further, phase sequence determination unit 36 determines on the basis of the present output level, which is high, and the value of Vq that the phase sequence is positive. As a result the output is maintained at a high level, and the status of the respective change-over switches 34a–34g is the through-state. Inverter control circuit 32 feeds back voltages detected by voltage detection devices 2e, 2f as Vuvout and Vwvout, respectively, and an inter U-V control signal is output to drive circuits 22a and 22b. Further, an inter W-V control signal is output to drive circuits 22c and 22d. On the display unit 33, it is indicated that the phase sequence is in the order of U-V-W.

On the other hand, when the phase sequence of the three phase ac power supply 1 is U-phase→W-phase→V-phase, Vq becomes a sine wave having an amplitude of approximately ±283 V. Phase sequence determination unit 36 determines on the basis of the present output status, which is high, and the wave form of Vq that the phase sequence is antiphase; therefore, in order to change its output to the low level, it causes respective change-over switches 34a–34g to be in the cross-over status. As a result, a detection value detected by voltage detection device 2a is input to converter control circuit 30 and power supply status computing unit 4 as Vwv, and a detection value detected by voltage detection device 2b is input to the converter control circuit 30 and power supply status computing unit 4 as Vuv. Since the input voltage to power supply status computing unit 4 is reversed, the result of its computation changes so that Vq becomes constant approximately at 283 V. The phase sequence determination unit determines on the basis of the current status of the output, which is low level, and the value of Vq that the phase sequence is antiphase, and display unit 33 displays an indication that the phase sequence is antiphase in the order of U-W-V.

Since Vuv, Vwv and Iu, Iw which have been input to converter control circuit 30 as feedback quantities are reversed respectively, the inter U-V voltage control block is supplied with Vwv and Iw, instead of Vuv and Iu, and the inter W-V voltage control block is supplied with Vuv and Iu, instead of Vwv and Iw. Then, a previous inter U-V voltage control signal is coupled to drive circuits 22i, 22j via AND circuits 31a, 31b, and a previous inter W-V voltage control signal is coupled to drive circuits 22g, 22h via AND circuits 31a, 31b. As a result, Vuv and Iu are adapted to control switching devices 23g and 23h, and Vwv and Iw are adapted to control switching devices 23i and 23j.

With respect to the voltage command value of the converter control circuit, the phase of Vwvref advances by 60 degrees from that of Vuvref, however, since the phase of Vuv advances by 60 degrees with respect to that of Vwv when in an antiphase condition, normal operation is ensured even in the antiphase status, provided that the voltage control blocks in the converter control circuit 30 are changed by means of change-over switches 34a–34d.

The same features and effects described above apply also to the inverter. In the case of an antiphase condition, change-over switches 34g –34f are in the cross-over status, thereby reversing feedback inputs, such that Vuvout is handled by the inter W-V voltage control block in inverter control circuit 32, while Vwvout is handled by the inter U-V voltage control block therein. Further, although the outputs from inverter control circuit 32 are reversed, since 34e and 34f are in a cross-over status, the feedback of Vuvout is used to control the switching devices 23a and 23b, and the feedback of Vwuout is used to control the switching devices 23c and 23d. As described above, by using the reversed line voltage command values in an inverter control circuit 32, the inverter can be operated normally also in antiphase state.

Through provision of a system configuration such as described above according to the invention, it becomes possible to operate the uninterruptible power supply unit of the invention normally independent of the phase sequence of the power supply.

By way of example, of the circuits and components described in FIG. 8, the functions of the converter control circuit 30, AND circuits 31a–31d, inverter control circuit 32, change-over switches 34a–34g, power interruption determination unit 35, phase sequence determination unit 36 and power supply status computing unit 4 can be easily implemented by software.

Embodiment 5

Figure 9:
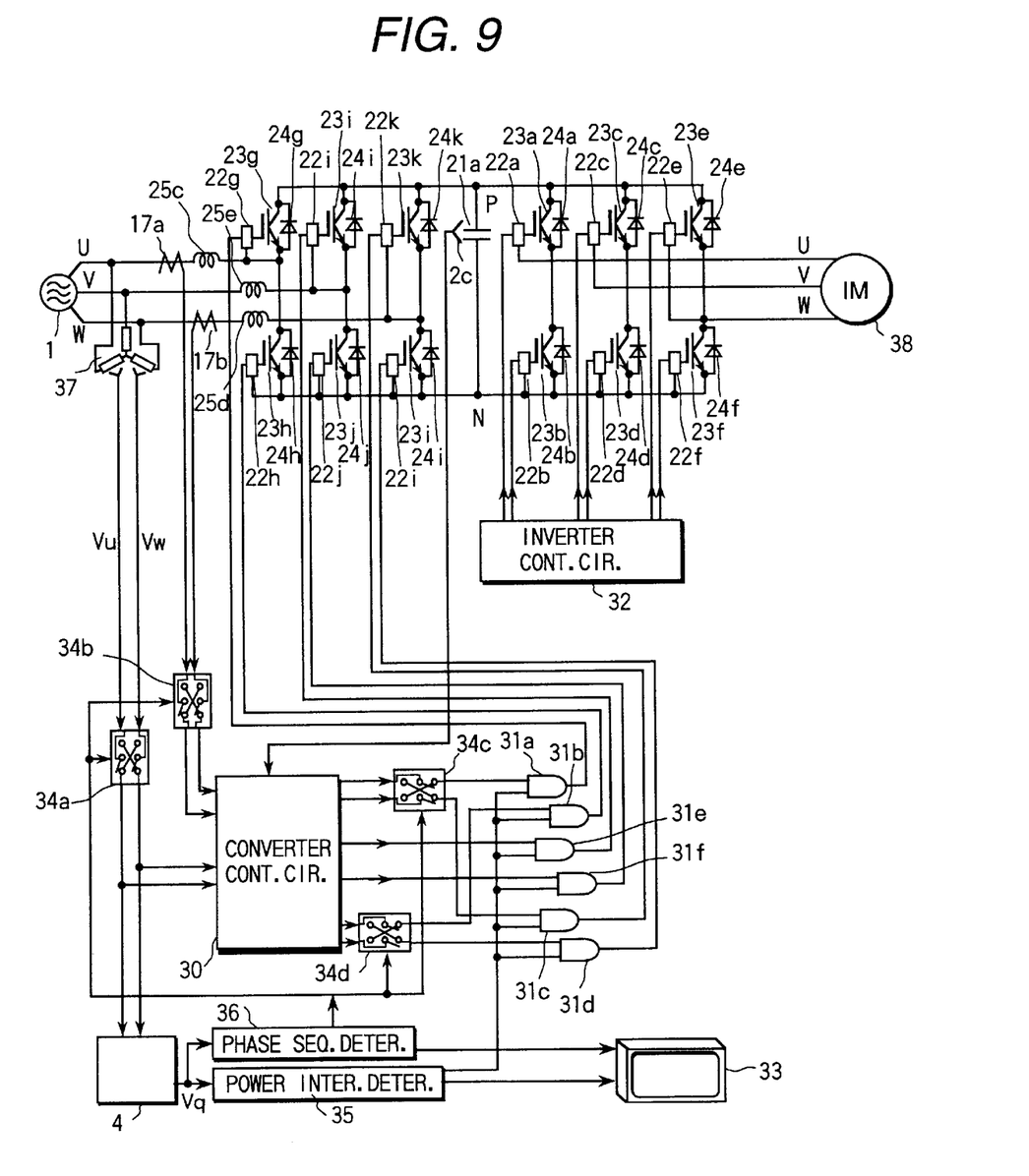
FIG. 9 is a schematic block diagram of the inverter equipment for controlling an induction motor according to a fifth embodiment of the invention.

A fifth embodiment of an inverter for motor control according to the invention will be described with reference to FIG. 9. In FIG. 9, the same circuits and components as described with reference to FIGS. 1, 6, 7 and 8 are given the same reference numbers. Reference numbers 22e, 22f, 22k and 22l depict drive circuits; 23e, 23f, 23k and 23l depict switching devices; 24e, 24f, 23k and 24l depict a diodes; 25e depicts reactor; 31e, 31f depict AND circuits; and 38 depicts an induction motor.

The circuit configuration of FIG. 9 will be described in detail in the following. Reactors 25c–25d are coupled to the three phase ac power supply 1. Respective pairs of switching devices 23g and 23h; 23i and 23j; 23k and 23l are connected in series, and respective interconnection points between respective pairs of switching devices connected in series are connected respectively to the other ends of respective reactors 25c–25e. Currents flowing through reactors 25c and 25d are detected by current detection devices 17a and 17b, respectively. High potential terminals of the switching devices 23g, 23i and 23k are connected together, which connection is defined as point P. Low potential terminals of the switching devices 23h, 23j and 23l are also connected together, which connection is defined as point N. Control terminals of the switching devices from 23g to 23l are connected with drive circuits from 22g to 22l, respectively. Further the switching devices from 23g to 23l are provided with diodes 24g to 24l, respectively in reverse parallel connection. A capacitor 21a is inserted between points P and N, and the voltage across capacitor 21a is detected by voltage detection device 2c. A phase voltage detection device 37 is coupled to the three phase ac power supply 1, and a detected voltage therefrom is input to converter control circuit 30 and power supply status computing unit 4 via change-over switch 34a. Currents detected by current detection devices 17a, 17b are input to converter control circuit 30 via change-over switch 34b. A voltage across capacitor 21a detected by voltage detection device 2c is input to converter control circuit 30. Six kinds of outputs are output from converter control circuit 30, of which two outputs are input via change-over switch 34c and through respective AND circuits 31a and 31c to drive circuits 22g and 22k, respectively. Another two outputs thereof are input via change-over switch 34d and through respective AND circuits 31b and 31d to drive circuits 22h and 22l, respectively. The remaining two outputs thereof are input directly through respective AND circuits 31e and 31f to drive circuits 22i and 22j, respectively. An output from power supply status computing unit 4 is supplied to power supply interruption determination unit 35 and phase sequence determination unit 36, respectively. An output from power supply interruption determination unit 35 is input to AND circuits 31a–31f, and also to display unit 33. An output from phase sequence determination unit 36 is output to change-over switches 34a–34d, and also to the display unit 33.

Respective pairs of switching devices 23a and 23b; 23c and 23d; and 23e and 23f are connected in series, and are coupled between points P and N. The control terminals of the switching devices 23a–23f are connected with drive circuits 22a –22f, respectively. Further, the switching devices 23a–23f are provided with diodes 24a–24f connected in reverse parallel, respectively. Inverter control circuit 32 is connected with drive circuits 22a–22f. Respective interconnection nodes between respective switching devices 23a and 23b; 23c and 23d; and 23e and 23f are connected to respective phases of the induction motor 38.

Now, the function of the circuit of FIG. 9 will be described. Under the initial condition, an output of the phase sequence determination unit 36 is high level, and the change-over switches 34a–34d are in a through-state, thereby phase voltages Vu and Vw are input to power supply status computing unit 4 in correct phase sequence from phase voltage detection device 37. The circuit configuration of the power supply status computing unit 4 is substantially the same as shown in FIG. 6, wherein Vq is computed on the basis of phase voltages Vu and Vw. When the phase sequence of three the phase ac power supply 1 in the sequence of U-V-W, and an effective value of the line voltage is 200 V, Vq becomes constant approximately at 283 V. Phase sequence determination unit 36 determines on the basis of the present output status being high and the value of Vq, that the phase sequence of the three phase ac power supply 1 is positive, and ensures that a high output status is maintained. The display unit displays an indication that the phase sequence of the input power is in the sequence of U-V-W. Power supply interruption determination unit 35 determines on the basis of the value of Vq being approximately 283 V that the power is in a conduction state, and outputs a high level to AND circuits 31a–31f. Thus, AND circuits 31a–31f become conductive, thereby causing the output signals from converter control circuit 30 to reach drive circuits 22g–22l via the change-over switches, which are in the through state. Converter control circuit 30, in response to inputs of the phase voltages Vu and Vw, reactor currents Iu and Iw, and a dc voltage Vpn, controls respective phase currents to the converter to become a sine wave current which is in synchronism with the power supply voltage. On the other hand, inverter control circuit 32, which causes switching devices 23a–23f to be driven via drive circuits 22a–22f, executes adaptive speed control of the induction motor 38.

Under such conditions as described above, when three phase ac power supply 1 is interrupted, Vq which is output from power supply status computing unit 4 becomes 0 or changes to the wave form as depicted in FIG. 5(a). Hence, the power supply interruption determination unit 35 determines on the basis of the change of Vq that the input power supply is interrupted, then changes the output to the AND circuits 31a–31f from the present high level to low level. In response to this change of output level, all of the outputs from AND circuits 31a–31f become low, thereby switching off all the switching devices 23f–23l in the converter. Further, the output from power supply interruption determination unit 35 is also sent to display unit 33 to display the state of interruption of the main power supply.

In the case where the phase sequence of the three phase ac power supply 1 is in the sequence of U-W-V, the Vq output from the power supply status computing unit 4 becomes a sine wave, as depicted in FIG. 4(c), having an amplitude of approximately ±283 V. The phase sequence determination unit 36 determines on the basis of this wave form of Vq and the status of the high level output to change the present status of the high level output to a low level output. Hence, respective change-over switches 34a–34d are altered to the cross-over state. As a result, the voltages Vu and Vw, which are detected by the phase voltage detection unit 37 are input in reversed sequence with respect to the previous sequence to converter control circuit 30 and power supply status computing unit 4. Since the input voltage to the power supply status computing unit 4 is reversed, the result of the computation changes, and Vq becomes constant approximately at 283 V. The phase sequence determination unit determines on the basis of the present status of the output which is changed to low level, and the value of Vq that the phase sequence is antiphase, and causes display unit 33 to display an indication that the phase sequence of the power supply is in the sequence of U-W-V.

In the converter control circuit 30, since feedback quantities of Vu and Vw, and Iu and Iw are input in reversed sequences, respectively, the U-phase voltage control block is changed to receive Vw and Iw, instead of Vu and Iu, and the W-phase voltage control block is changed to receive Vu and Iu, instead of Vw and Iw. Hence, the previous U-phase voltage control signal is connected to drive circuits 22k and 22l via AND circuits 31c and 31d, while the previous W-phase voltage control signal is connected to drive circuits 22g and 22h via AND circuits 31a and 31b. In consequence, switching devices 23g and 23h are adapted to be controlled by Vu and Iu, and switching devices 23k and 23l are adapted to be controlled by Vw and Iw.

With respect to the voltage command value in the converter control circuit, the phase of Vwref is advanced by 120 degrees from the phase of Vuref. However, since the phase of Vu advances by 120 degrees respect to that of Vw at the time of an antiphase condition, by altering the voltage control blocks within the converter control circuit 30 by means of change-over switches 34a–34d, normal operation can be ensured even in the antiphase condition.

Through provision of an induction motor control inverter system having the circuit configuration as described hereinabove, the inverter system of the invention can ensure normal operation independent of the phase sequence of the power supply.

By way of example, of those circuits and components described in FIG. 9, the functions of converter control circuit 30, AND circuits 31a–31f, inverter control circuit 32, change-over switches 34a–34d, power supply interruption determination unit 36 and power supply status computing unit 4 can be easily implemented by software.

What is claimed is:

1. An electric power conversion apparatus having a converter unit which rectifies a three phase ac power supply using switching devices, comprising:

a phase detection unit which detects a phase sequence of said three phase ac power supply; and a display unit which displays the phase sequence detected by said phase detection unit, including an indication that a phase sequence connection of said three phase ac power supply is incorrect when the phase sequence detected by said phase detection unit is a negative phase sequence.

2. An electric power conversion apparatus according to claim 1, wherein said phase detection unit further detects a power supply interruption due to a phase interruption of at least one phase of said three phase ac power supply.

3. An electric power conversion apparatus according to claim 2, further including means for stopping operation of said converter unit when the phase sequence of said three phase ac power supply detected by said phase detection unit is in said negative phase sequence, or when said power supply interruption is detected by said phase detection unit.

4. An electric power conversion apparatus according to claim 2, further including means for controlling said converter unit to continue operation when the phase sequence of said three phase ac power supply detected by said phase detection unit is in said negative phase sequence, and to stop operation when said power supply interruption is detected by said phase detection unit.

5. An electric power conversion apparatus according to claim 1, wherein said three phase ac power supply provides an uninterruptible power supply to a load.

6. An electric power conversion apparatus having a converter unit which rectifies a three phase ac power supply using switching devices, said electric power converter comprising:

a line voltage detection unit which detects a first line voltage and a second line voltage of said three phase ac power supply with one phase of which serving as a reference phase; and a computation unit which computes a phase of the first line voltage, and which determines a phase sequence of said three phase ac power supply and a state of a power supply interruption by:

computing a first computation result which is obtained by subtracting the first line voltage from two times the second line voltage, and dividing a result of substraction by the square root of three;

computing a second computation result which is obtained by subtracting a value of said first computation result multiplied by the cosine of said phase from a value of the first line voltage multiplied by the sine of said phase;

determining when said second computation result remains constant with time such that said phase of the first line voltage advances by sixty degrees with respect to the second line voltage;

determining when said second computation result oscillates at a constant cycle between positive and negative values with a mean value being zero such that the phase of the first line voltage lags by sixty degrees with respect to the second line voltage;

determining when the second computation result oscillates at a constant cycle between positive and negative values with a means value being positive such that one of the phases other than the reference phase is grounded;

determining when the second computation result oscillates at a constant cycle between positive values such that said reference phase is grounded; and determining when the second computation result remains constant at zero such that all of the three phases are interrupted.

7. An electric power conversion apparatus appararus comprising:

a converter unit which rectifies a three phase ac power supply;

a phase voltage detection unit which detects a first phase voltage and a second phase voltage of the three phase ac power supply; and a computation unit which computes a phase of the first phase voltage, and which determines a phase sequence of said three phase ac power supply and a state of a power supply interruption by:

computing a first computation result which is obtained by adding a value of said second phase voltage multiplied by two to said first phase voltage;

computing a second computation result which is obtained by subtracting a value of said first computation result which is multiplied by the cosine of said phase from a value of the product of said first phase voltage multiplied by the square root of three and the sine of said phase;

determining when said second computation result remains constant with time such that a phase of the second phase voltages advances by a hundred twenty degrees with respect to the first phase voltage;

determining when said second computation result oscillates at a constant cycle between positive and negative values with a mean value being zero such that the phase of the second phase voltage lags by a hundred twenty degrees with respect to the first phase voltage;

determining when said second computation result oscillates at a constant cycle with a mean value being positive such that one of the said first and second phases is grounded; and determining when said second computation result remains constant at zero such that all the three phases are interrupted.

8. An electric power conversion apparatus according to claim 1, wherein said phase detection unit comprises:

a voltage detection unit which detects three phase ac voltages;

a voltage status computing unit which computes a status voltage having a waveform on the basis of said three phase ac voltages; and a power supply status determination unit which determines said phase sequence of said three phase ac power supply on the basis of said status voltage.

9. An electric power converter according to claim 8, wherein said voltage status computing unit comprises:

a zero-crossing detector which detects a zero crossing of a first line voltage from said three phase ac voltages and which generates an edge trigger signal in accordance with said zero crossing of said first line voltage;

a phase computing unit which computes a phase of said first line voltage in accordance with said edge trigger signal; and a voltage computing unit which computes said status voltage in accordance with said first and second line voltages and said phase of said first line voltage.

10. An electric power conversion apparatus according to claim 9, wherein said phase computing unit comprises:

a reference frequency generator which generates a reference frequency corresponding to a frequency of said three phase ac power supply;

a sampler which samples said edge trigger signal and which generates a sampled output; and an integrator which integrates a combination of said sampled output from the sampler and said reference frequency from the reference frequency generator, and which generates said phase of said first line voltage.

11. An electric power conversion apparatus according to claim 9, wherein said voltage computing unit computes said status voltage having a waveform on the basis of said three phase ac voltages by:

computing a first computation result which is obtained by subtracting the first line voltage from two times the second line voltage, and dividing a result of substraction by the square root of three;

computing a second computation result which is obtained by subtracting a value of said first computation result multiplied by the cosine of said phase of the first line voltage from a value of the first line voltage multiplied by the sine of said phase of the first line voltage;

determining when said second computation result remains constant with time such that said phase of the first line voltage advances by sixty degrees with respect to the second line voltage;

determining when said second computation result oscillates at a constant cycle between positive and negative values with a mean value being zero such that the phase of the first line voltage lags by sixty degrees with respect to the second line voltage;

determining when the second computation result oscillates at a constant cycle between positive and negative values with a means value being positive such that one of the three phases is grounded;

determining when the second computation result oscillates at a constant cycle between positive values such that a reference phase from the three phases is grounded; and determining when the second computation result remains constant at zero such that all of the three phases are interrupted.

12. An electric power conversion apparatus according to claim 8, further comprising a power supply failure determination unit which determines whether there is an interruption of power from said three phase ac power supply.

13. An electric power conversion apparatus according to claim 11, further comprising a power supply failure determination unit which determines whether there is an interruption of power from said three phase ac power supply.

14. An electric power conversion apparatus, comprising:

a voltage detection unit which detects three phase ac voltages from a three phase ac power supply;

a voltage status computing unit which computes and outputs a computed voltage having a different waveform on the basis of a phase sequence of said three phase ac voltages detected;

a power supply status determination unit which determines a phase sequence of said three phase ac power supply on the basis of the computed voltage; and a display unit which displays the phase sequence of said three phase ac power supply, including an indication that a phase sequence connection is incorrect when the phase sequence of said three phase ac power supply indicates a negative phase sequence.

15. An electric power conversion apparatus according to claim 14, wherein said voltage status computing unit comprises:

a zero-crossing detector which detects a zero crossing of a first line voltage from said three phase ac voltages and which generates an edge trigger signal in accordance with said zero crossing of said first line voltage;

a phase computing unit which computes a phase of said first line voltage in accordance with said edge trigger signal; and a voltage computing unit which computes said status voltage in accordance with said first and second line voltages and said phase of said first line voltage.

16. An electric power conversion apparatus according to claim 15, wherein said phase computing unit comprises:

a reference frequency generator which generates a reference frequency corresponding to a frequency of said three phase ac power supply;

a sampler which samples said edge trigger signal and which generates a sampled output; and an integrator which integrates a combination of said sampled output from the sampler and said reference frequency from the reference frequency generator, and which generates said phase of said first line voltage.

17. An electric power conversion apparatus according to claim 15, wherein said voltage computing unit computes said status voltage having a waveform on the basis of said three phase ac voltages by:

computing a first computation result which is obtained by subtracting the first line voltage from two times the second line voltage, and dividing a result of substraction by the square root of three;

computing a second computation result which is obtained by subtracting a value of said first computation result multiplied by the cosine of said phase of the first line voltage from a value of the first line voltage multiplied by the sine of said phase of the first line voltage;

determining when said second computation result remains constant with time such that said phase of the first line voltage advances by sixty degrees with respect to the second line voltage;

determining when said second computation result oscillates at a constant cycle between positive and negative values with a mean value being zero such that the phase of the first line voltage lags by sixty degrees with respect to the second line voltage;

determining when the second computation result oscillates at a constant cycle between positive and negative values with a means value being positive such that one of the three phases is grounded;

determining when the second computation result oscillates at a constant cycle between positive values such that a reference phase from the three phases is grounded; and determining when the second computation result remains constant at zero such that all of the three phases are interrupted.

18. An electric power conversion apparatus according to claim 16, wherein said voltage computing unit computes said status voltage having a waveform on the basis of said three phase ac voltages by:

computing a first computation result which is obtained by subtracting the first line voltage from two times the second line voltage, and dividing a result of substraction by the square root of three;

computing a second computation result which is obtained by subtracting a value of said first computation result multiplied by the cosine of said phase of the first line voltage from a value of the first line voltage multiplied by the sine of said phase of the first line voltage;

determining when said second computation result remains constant with time such that said phase of the first line voltage advances by sixty degrees with respect to the second line voltage;

determining when said second computation result oscillates at a constant cycle between positive and negative values with a mean value being zero such that the phase of the first line voltage lags by sixty degrees with respect to the second line voltage;

determining when the second computation result oscillates at a constant cycle between positive and negative values with a means value being positive such that one of the three phases is grounded;

determining when the second computation result oscillates at a constant cycle between positive values such that a reference phase from the three phases is grounded; and determining when the second computation result remains constant at zero such that all of the three phases are interrupted.

19. An electric power conversion apparatus according to claim 14, further comprising a power supply failure determination unit which determines whether there is an interruption of power from said three phase ac power supply.

20. An electric power conversion apparatus according to claim 16, further comprising a power supply failure determination unit which determines whether there is an interruption of power from said three phase ac power supply.

* * * * *